(12) United States Patent  
Dewanjee et al.

(10) Patent No.: US 7,540,990 B1  
(45) Date of Patent: Jun. 2, 2009

(54) CROSS-LINKED THERMOPLASTIC POLYURETHANE/POLYUREA AND METHOD OF MAKING SAME

(75) Inventors: Pijush K. Dewanjee, Carlsbad, CA (US); John G. Guard, Oceanside, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 12/260,279

(22) Filed: Oct. 29, 2008

Related U.S. Application Data

(60) Continuation-in-part of application No. 12/184,394, filed on Aug. 1, 2008, which is a division of application No. 10/992,907, filed on Nov. 18, 2004, now Pat. No. 7,417,094.

(51) Int. Cl.
 *B29C 45/14* (2006.01)
 *B29B 7/30* (2006.01)
 *A63B 37/12* (2006.01)
(52) U.S. Cl. .................... 264/328.6; 264/279.1
(58) Field of Classification Search ............. 264/275, 264/279.1, 279, 328.6; 525/457
 See application file for complete search history.

(56) References Cited

U.S. PATENT DOCUMENTS

| | | | |
|---|---|---|---|
| 3,642,964 A * | 2/1972 | Rausch | ............. 264/40.6 |
| 3,845,021 A | 10/1974 | Dukes et al. | |
| 5,028,685 A | 7/1991 | Ho et al. | |
| 6,855,076 B2 | 2/2005 | Matroni et al. | |
| 6,939,924 B2 | 9/2005 | Kim et al. | |
| 2002/0039935 A1 * | 4/2002 | Dewanjee | ............. 473/371 |
| 2003/0065124 A1 | 4/2003 | Rosenberg et al. | |
| 2007/0155895 A1 | 7/2007 | Rukavina et al. | |

OTHER PUBLICATIONS

Estane 58130 TPU Product Data Sheet, Estane Thermoplastic Polyurethanes (2001), 2 pages.*

* cited by examiner

*Primary Examiner*—Matthew J. Daniels  
(74) *Attorney, Agent, or Firm*—Michael A. Catania; Elaine H. Lo

(57) ABSTRACT

A process for forming a cross-linked thermoplastic polymer is disclosed herein. The cross-linked thermoplastic polymer is formed by heating a first mixture containing a thermoplastic urethane base material, a monomeric diisocyanate comprising between 1 to 10% of the total weight of the first mixture, and a second mixture of a first diamine and a second diamine comprising between 1 to 10% of the total weight of a total reaction product. The heated first mixture, which is flowable, is injected into at least one injection molding device, with the second mixture injected at predetermined intervals to create a homogeneous reaction product.

1 Claim, 2 Drawing Sheets

CROSS-LINKED THERMOPLASTIC POLYURETHANE/POLYUREA AND METHOD OF MAKING SAME

CROSS REFERENCES TO RELATED APPLICATIONS

The Present Application is a continuation-in-part application of U.S. patent application Ser. No. 12/184,394 filed on Aug. 1, 2008, which is a divisional application of U.S. patent application Ser. No. 10/992,907, filed on Nov. 18, 2004, now U.S. Pat. No. 7,417,094.

STATEMENT REGARDING FEDERALLY SPONSORED RESEARCH OR DEVELOPMENT

Not Applicable

BACKGROUND OF THE INVENTION

1. Field of the Invention

The field of the invention generally relates to thermoplastic polyurethanes and thermoplastic polyureas having properties similar to those of castable or cross-linked polyurethanes or polyureas. The field of the invention also includes methods of making the same.

2. Description of the Related Art

There currently are a number of commercialized products made from polyurethanes and polyureas. Typically, these products made from either thermoplastic polyurethanes (or polyureas) or thermoset polyurethanes (or polyureas). Thermoplastic polyurethanes generally have linear molecular structures and are able to flow freely at elevated temperatures. For this reason, thermoplastic polyurethanes are preferred for products which are produced by injection molding or other extrusion techniques, where flowability of the reactants are of paramount importance. Unfortunately, thermoplastic polyurethanes typically exhibit poor performance characteristics with respect to abrasion, tensile strength, rebound, and compression set compared to castable polyurethanes.

In contrast to current thermoplastic polyurethanes, thermoset polyurethanes have particularly good characteristics with respect to abrasion, tensile strength, rebound, and compression set. Thermoset polyurethanes generally have a network structure that incorporates irreversible chemical cross-linking. The downside of thermoset polyurethanes is that the irreversible chemical cross-linking reaction makes it unsuitable for use in injection molding and extrusion applications. Typically, thermoset polyurethanes are formed using a casting process. Unfortunately, casting processes require costly equipment and usually involve a large number of processing steps. Casting is thus a less efficient and more expensive method of producing polyurethane-based and polyurea-based products as compared to injection molding and extrusion systems.

In a typical process for making a thermoset (i.e., castable) polyurethane, a di-isocyanate component is first pre-polymerized with a polyol having either a polyester or polyether backbone. The remaining di-isocyanate of the pre-polymer is reacted with a chain extender or a cross-linking agent or a blend of cross-linking agents. Catalysts are added to control the reaction rate. If the cross-linking agent has a dihydroxy functional component, a polyurethane will be formed. If the cross-linking agent has diamine functionality, a polyurea is formed.

With respect to thermoplastic polyurethanes, a diol or polyol is reacted with an isocyanate. This reaction typically takes place in large commercial reactors. As stated above, thermoplastic polyurethanes, while not cross-linked, are usable in injection molding and other extrusion methods. Because of the lack of cross-linking, these materials have abrasion, tensile, and compression set properties that are not as good as thermoset polyurethane or polyurea systems.

There thus is a need for a thermoplastic polyurethane or polyurea material which exhibits good abrasion, tensile strength, rebound, and compression set characteristics which are similar to those found in thermoset urethanes. Such a material could be produced using conventional injection molding and/or extrusion techniques, thereby reducing the cost of manufacture for the material.

The conventional solution has been to add a cross-linking agent to a thermoplastic resin, either post-injection molding or pre-injection molding. Adding the cross-linking agent pre-injection molding allows for a greater dispersion of the cross-linking agent within the thermoplastic resin material. However, many cross-linking agents have low boiling temperatures and will "flash off" prior to dispersion, especially at room temperatures. Trying to add other agents to resolve the flash off problems leads to other processing issues, especially with injection molding machines which melt processing materials (thermoplastic resins) and inject the melted materials under high pressures to form various articles, which can lead to a build up of materials in the injection molding barrel.

BRIEF SUMMARY OF THE INVENTION

The present invention provides a solution for forming cross-linked thermoplastic polymers. The present invention adds a cross-linking agent a thermoplastic resin in the pre-injection molding stage. In order to prevent the cross-linking agent from flashing-off, a second mixture is added during the injection molding stage. This second mixture prevents the flashing off of the cross-linking agent while allowing for processing without a build-up of material.

One aspect of the present invention is a method for forming an article composed of a cross-linked thermoplastic polymer. The method includes mixing a thermoplastic urethane based material and a monomeric diisocyanate to create a first mixture. The monomeric diisocyanate comprises between 1% to 10% of the total mass of the first mixture, the diisocyanate. The method also includes mixing 4,4'methylene-bis-(3-chloro-2,6-diethylaniline) and diethyl 2,4-toluenediamine to create a second mixture. The 4,4'methylene-bis-(3-chloro-2, 6-diethylaniline) is 75% to 95% of the total mass of the second mixture and diethyl 2,4-toluenediamine is 25% to 5% of the total mass of the second mixture. The method also includes heating the first mixture to a temperature within the range of 250° F. to 550° F. to created a heated first mixture. The method also includes heating the second mixture to a temperature greater than the melting point of the second mixture and less than 225° F. to create a liquid second mixture having a volume. The method also includes injecting the heated first mixture into a barrel of an injection molding machine through a first opening. The method also includes injecting the liquid second mixture into the barrel of the injection molding machine in a plurality of dispensing shots of approximately equal amounts of the volume of the liquid second mixture during a predetermined time period. The method also includes injecting a reaction product into at least one injection mold cavity, the reaction product formed by the reaction of the heated first mixture and the liquid second mixture. The method also includes forming an article composed of the reaction product.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
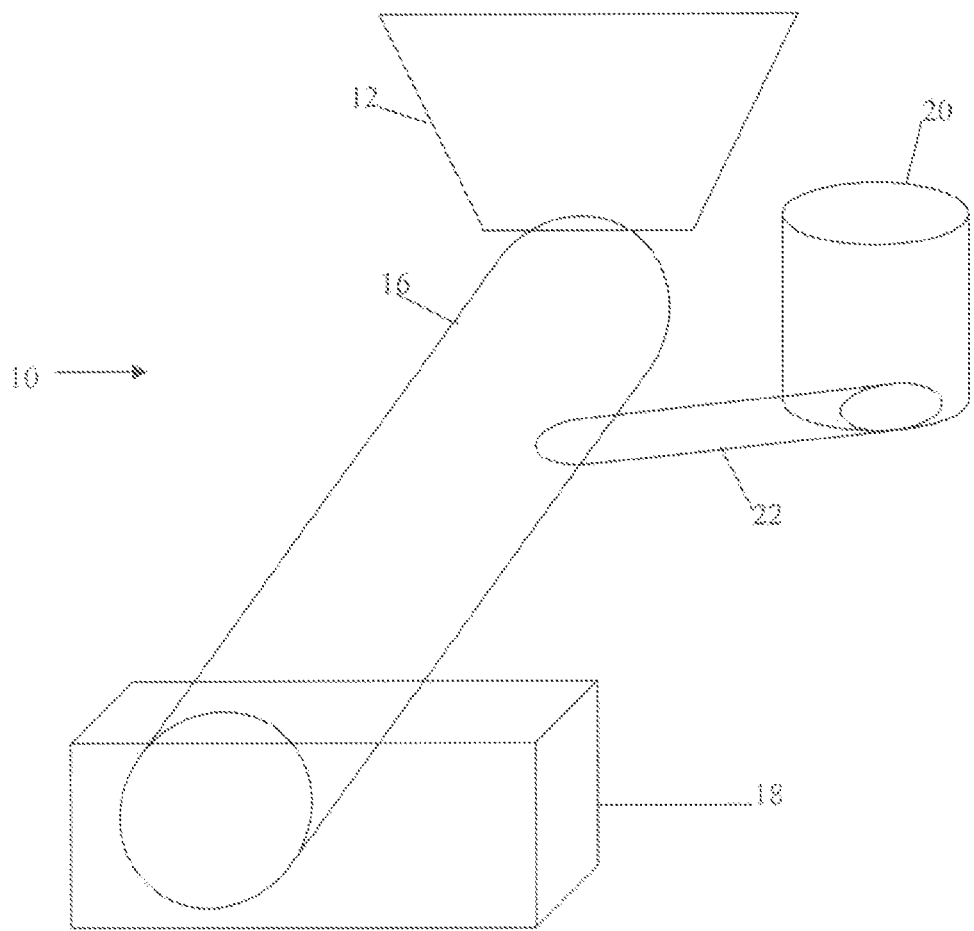
FIG. 1 schematically illustrates an injection molding device which can be used to produce products made from cross-linked thermoplastic polyurethanes/polyureas according to the present invention.

The method for forming a cross-linked thermoplastic polyurethane or polyurea generally involves four different components. The first component is a thermoplastic polyurethane resin material. The second component is a diisocyanate. The third component is a diamine. The fourth component is a diamine.

The thermoplastic polyurethane resin material and the diisocynate are preferably mixed in a dry state to create a first dry mixture. The third and fourth components, the diamines, are mixed together to create a liquid second mixture. The dry mixture is heated into a flowable form and the liquid second mixture is introduced at predetermined intervals of equal amounts to create a homogeneous reaction product.

The thermoplastic polyurethane base material may include TEXIN 985, an aromatic polyether-based thermoplastic polyurethane available from Bayer Corporation. As another example, the thermoplastic urethane base material may include NOVEON ST80A, which is available from Noveon Incorporated. Another thermoplastic polyurethane is IROGAN A 95 P 4021 from Huntsman Chemical. IROGAN A 95 P 4021 is a thermoplastic polyether-polyurethane having a Shore A hardness of approximately 95, a Shore D hardness of approximately 46, a melt index of 210° C./21.6 kilograms at 5-15 grams/10 minutes. Another thermoplastic polyurethane is TEXIN DP7 1197 from Bayer Corporation. TEXIN DP7-1197 is a thermoplastic polyester polyurethane having a Shore A hardness of 88. Another thermoplastic polyurethane is DESMOPAN 445 from Bayer Corporation. DESMOPAN is a thermoplastic polyester polyurethane having a Shore D hardness of 45.

The thermoplastic urethane base material is preferably dried prior to adding the additional components described in detail below. This can be accomplished, for example, by heating the thermoplastic base material to a temperature between about 100° F. to 200° F. in a separate container.

A monomeric diisocyanate is added to the dried thermoplastic urethane base material. Preferably, the diisocyanate used in the process is a solid at room temperature. In one preferred aspect of the invention, the diisocyanate is 4,4' diphenylmethane diisocyanate, which has a sublimation point of approximately 392° F. This can be commercially obtained from Bayer Corporation under the trade name, MONDUR M (CAS No. 101-68-8). Preferably, the flaked or fused form of MONDUR M is used in connection with the process described herein. The diisocyanate is preferably stored at about −20° C. By adding diisocyanate to the thermoplastic urethane base material, isocyanate functionality is added to the system. Other Diisocyanate materials which are solid at room temperature and may be used in accordance with the invention include: Toluene Diisocyanates (TDI), Toluene ortho Diisocyanates (TODI), Naphthalene Diisocyanates (NDI), Hydrogenated Methylene Diisocyanates (H12MDI), Iso Phorone Diisocyanates (IPDI), Hexamethylene Diisocyanates (HDI). These isocyanate-based compounds can be made in solid crystalline form suitable for dry blending. These isocyanates can also be added in the liquid and semi-liquid form.

Preferably, the diisocyanate comprises between 1% to 10% of the total weight of the mixture forming the cross-linked thermoplastic polyurethane/polyurea. Even more preferably, the diisocyanate comprises between 1% to 2% of the total weight of the mixture forming the cross-linked thermoplastic polyurethane/polyurea. The diisocyanate materials other than those specifically identified above may also be used in accordance with the invention, provided they exist as a solid at room temperature.

One preferred diamine is 4,4'methylene-bis-(3-chloro-2,6-diethylaniline), available commercially as LONZACURE M-CDEA (CAS No. 106246-33-7). Another diamine which can be employed with the present invention is 4,4'Methylene-bis-(2,6-diethylaniline), available commercially as LONZACURE M-DEA (CAS No. 13680-35-8). Both diamines have melting points at approximately 90° C. Preferably, the diamine is added in solid form and dry blended with the MDI and thermoplastic urethane base material. Alternative cross-linking agents and other solid or crystalline Diamines which may be used in the present invention include: MOCA (4,4'-Methylenebis-(O-Chloroaniline)), MDA (Methylene Dianiline), as well as any other methylene bis aniline like LONZACURE M-CDEA described above. Any other diamine-based compounds can be made in solid crystalline form suitable for dry blending can also be used. The diamines above can also be added in the liquid or semi-liquid form.

A second diamine for the second mixture is preferably diethyl 2,4-toluenediamine, which is available under the brandname ETHACURE 100, or E100, from Albermarle of Baton Rouge, La. The diethyl toluene diamine prevents build-up due to the first diamine, preferably 4,4'methylene-bis-(3-chloro-2,6-diethylaniline). The second mixture is preferably 75 to 95 parts by weight 4,4'methylene-bis-(3-chloro-2,6-diethylaniline) and 5 to 25 parts by weight diethyl 2,4-toluenediamine, and more preferably 80 to 90 parts by weight 4,4'methylene-bis-(3-chloro-2,6-diethylaniline) and 10 to 20 parts by weight diethyl 2,4-toluenediamine, and most preferably 85 parts by weight 4,4'methylene-bis-(3-chloro-2,6-diethylaniline) and 15 parts by weight diethyl 2,4-toluenediamine.

The second mixture is preferably utilized to prevent the diisocynate from "flashing off" during the processing. The second mixture provides heat stability to the diisocynate during the processing. The second mixture also allows the temperature of the reaction to be reduced substantially which provides for a more favorable viscosity. Further, the use of 4,4'methylene-bis-(3-chloro-2,6-diethylaniline) allows for the diisocynate to be utilized at a higher temperature since the 4,4'methylene-bis-(3-chloro-2,6-diethylaniline) essentially increasing the boiling temperature of the diisocynate.

Preferably, the diamines comprises between 1% to 10% of the total weight of the mixture forming the cross-linked thermoplastic polyurea. Even more preferably, diamine comprises between 1% to 2% of the total weight of the mixture forming the cross-linked thermoplastic polyurea. Diamines other than those specifically identified above may also be used in accordance with the invention, provided they exist as a solid at a temperature within the range of 50° F. to 150° F.

In an alternative embodiment, hydroquinone (HQEE) replaces the diamine constituent and is added to the mixture of MDI and thermoplastic urethane. As with the prior embodiment, HQEE is added to the mixture in solid form and dry blended with the MDI and thermoplastic urethane base material. In yet another alternative embodiment, HQEE is added in conjunction with a diamine.

The mixture of thermoplastic urethane base material, MDI, and diamine (and/or HQEE) is then mixed and heated to a temperature within the range of 250° F. to 550° F. The solid thermoplastic urethane base material, MDI, and diamine (and/or HDEE) melt and partially cross-link. Preferably, the partially cross-linked thermoplastic polyurethane/polyurea is post-cured by heating the same to a temperature within the range of 150° F. to 250° F. for a period of time ranging between 2 and 36 hours.

FIG. 1 illustrates an injection molding device 10 capable of producing cross-linked thermoplastic polymers in accordance with the present invention. The injection molding device 10 includes a hopper 12 for loading the various components (e.g., a first mixture of thermoplastic urethane resins and MONDUR flakes). The hopper 12 preferably includes a rotating mixer therein for dry mixing the first mixture materials.

The hopper 12 is in flow communication with a mixing barrel 16 having a screw (not shown). The screw is disposed inside the mixing barrel 16, and both rotates and reciprocates within the mixing barrel 16. The distal end of the mixing barrel 16 terminates into an injection chamber and injection nozzle. The injection nozzle is preferably disposed inside a stationary platen and is in flow communication with a mold 18. The mold 18 preferably includes one or more cavities (not shown) having a pre-formed shape. The injection molding device 10 may be used to form any number of products including, for example, skateboard wheels, in-line skate wheels, roller coaster wheels, caster wheels, golf ball layers, and golf club components, and the like. Products in the automotive industry such as seals, O-rings, gaskets, bushings, CV-joint cover, and tires may also be made using the methods described herein. For agricultural applications, the methods can be used in silo liners, plow parts, pipe, and pipe liners. The invention also has utility in mining applications, where the methods and processes described herein can be used to produce mining screens, material moving buckets, pump parts and liners, pulleys, and bumpers. The materials and methods can also be used in footwear applications such as, for example, shoe soles and the like. The invention can also be used in general purpose applications such as press pads, abrasion-resistant silo or hopper liner sheets, gears, hammers, metal forming parts, etc. The injection molding device also includes a secondary mixing chamber 20 for mixing and heating a second mixture for introduction into the barrel 16. The secondary mixing chamber 20 is in flow communication with the barrel 16 through a flow pipe 22.

Figure 2:
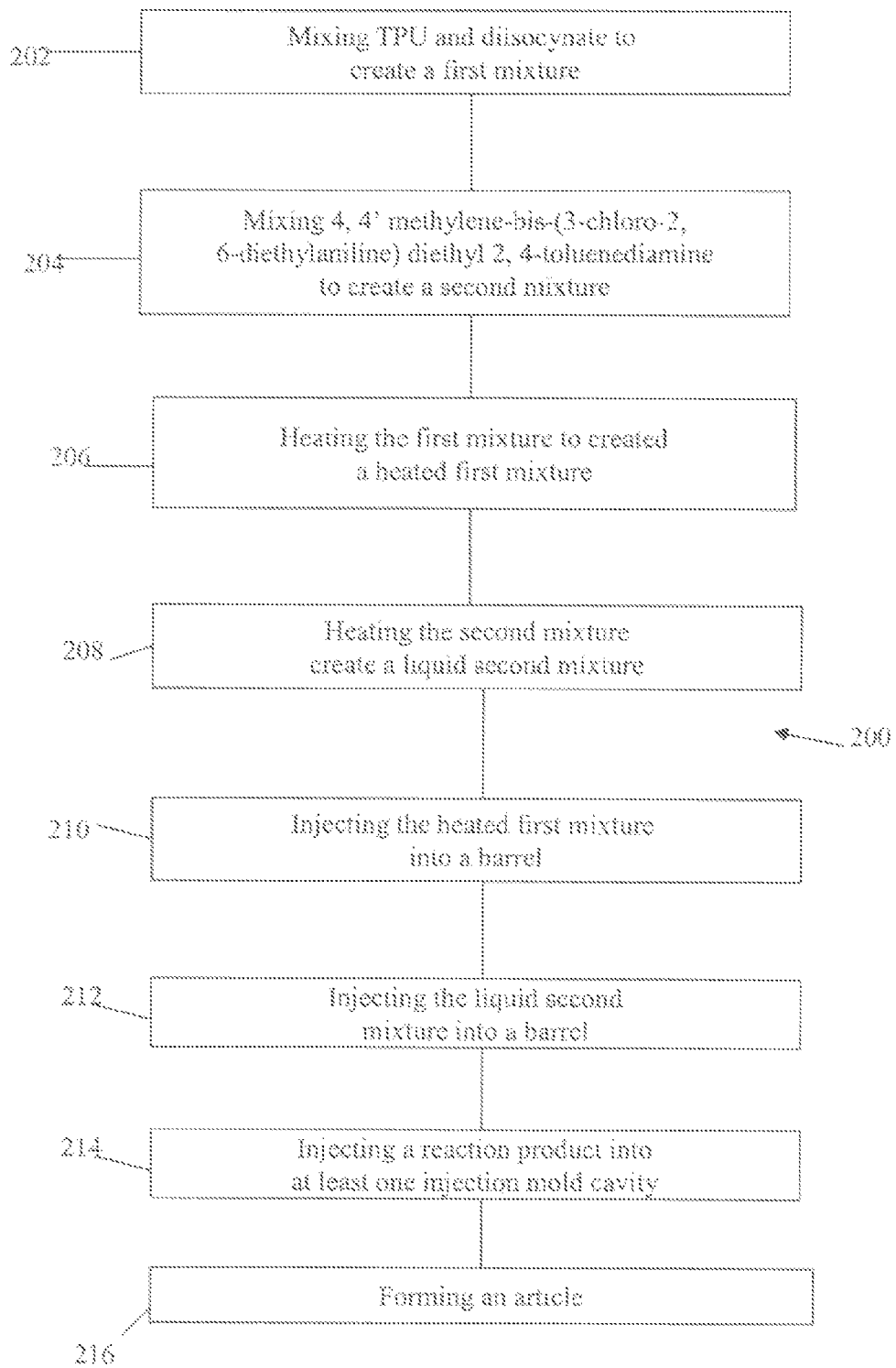
FIG. 2 is a flow chart of a method of the present invention.

FIG. 2 is a flow chart of a preferred method 200 of the present invention. At block 202, the thermoplastic polyurethane ("TPU") resin and a diisocynate are mixed to create a first mixture. The monomeric diisocynate comprises between 1% to 10% of the total mass of the first mixture, and most preferably 6% by weight of the first mixture. Preferably the diisocynate is MONDUR flakes. At block 204, 4,4'methylene-bis-(3-chloro-2,6-diethylaniline) and diethyl 2,4-toluenediamine are mixed to create a second mixture. The second mixture is preferably mixed in the secondary mixing chamber 20 as described in reference to FIG. 1. The 4,4'methylene-bis-(3-chloro-2,6-diethylaniline) is preferably 75% to 95% of the total mass of the second mixture and diethyl 2,4-toluenediamine is 25% to 5% of the total mass of the second mixture. At block 206, the first mixture is heated to create a first heated mixture. The first mixture is heated to a temperature preferably within the range of 250° F. to 550° F. to create a heated first mixture. At block 208, the second mixture is heated to create a liquid second mixture. The liquid second mixture is preferably created in the secondary mixing chamber 20. The second mixture is preferably heated to a temperature greater than the melting point of the second mixture and less than 225° F. to create a liquid second mixture having a predetermined volume. At block 210, the heated first mixture is injected into a barrel through an opening at one end of the barrel, preferably the barrel 16 as described in reference to FIG. 1. At block 212, the liquid second mixture is injected into the barrel at predetermined intervals and in predetermined amounts. In a preferred embodiment, the liquid second mixture is injected into the barrel four times in four equal amounts of the volume of the liquid second mixture in order to create a homogeneous reaction product. Each of the four injections of the liquid second mixture is preferably 1 to 20 grams of the liquid second mixture. At block 214, the reaction product is injected into a mold cavity, preferably a cavity of a mold 18 as described in reference to FIG. 1. At block 216, an article is formed from the reaction product within the mold 18. The article is preferably an article such as discussed above.

The following are experimental test results of various cross-linked thermoplastic urethanes/ureas in accordance with the present invention. Example 1 is a control of TEXIN DP7-1197 thermoplastic polyurethane. Example 2 is TEXIN DP7-1197 thermoplastic polyurethane crosslinked at 2/2. Example 3 is TEXIN DP7-1197 thermoplastic polyurethane crosslinked at 2/3. Example 4 is TEXIN DP7-1197 thermoplastic polyurethane crosslinked at 2.5/3. Example 5 is a control of DESMOPAN 445 thermoplastic polyurethane. Example 6 is DESMOPAN 445 thermoplastic polyurethane crosslinked at 2/2. Example 7 is DESMOPAN 445 thermoplastic polyurethane crosslinked at 2/3. Example 8 is DESMOPAN 445 thermoplastic polyurethane crosslinked at 2.5/3. Example 9 is DESMOPAN 445 thermoplastic polyurethane crosslinked at 2.5/5. Example 8 is DESMOPAN 445 thermoplastic polyurethane crosslinked at 2.5/7. The thermoplastic polyurethanes crosslinked according to the present invention (Examples 2-4 and 6-10) demonstrate much better properties than the control samples (Examples 1 and 5).

TABLE ONE

| TEST | 1 | 2 | 3 | 4 | 5 | 6 | 7 | 8 | 9 | 10 |
| --- | --- | --- | --- | --- | --- | --- | --- | --- | --- | --- |
| Tensile Test-ASTM D 412-Die C-strength at 100% elongation | 885 psi | 1007 | 1042 | 1074 | 1499 | 1566 | 1715 | 1714 | 1849 | 2090 |
| Tensile Test-ASTM D 412- | 2004 psi | 2239 | 2360 | 2447 | 2360 | 2514 | 3046 | 3015 | 3232 | 3736 |

TABLE ONE-continued

| TEST | 1 | 2 | 3 | 4 | 5 | 6 | 7 | 8 | 9 | 10 |
|---|---|---|---|---|---|---|---|---|---|---|
| Die C-strength at 300% elongation Tensile Test-ASTM D 412- | | | | | | | | | | |
| Die C-ultimate elongation Tensile Test-ASTM D 412- | 675% | 598 | 621 | 619 | 641 | 547 | 510 | 499 | 422 | 364 |
| Die C-ultimate tensile strength | 6040 psi | 6212 | 6963 | 6493 | 4109 | 3799 | 4714 | 4684 | 4325 | 4396 |
| Die "C" Tear ASTM D 624-D 3489-tear resistance | 686 pli | 676 | 641 | 615 | 706 | 710 | 707 | 693 | 702 | 715 |
| Durometer Hardness, Shore A-ASTM D 2240-hardness at 5 secs. | 89 | 90 | 90 | 91 | 94 | 94 | 94 | 94 | 96 | 97 |
| Durometer Hardness, Shore D-ASTM D 2240-hardness at 5 secs. | 31 | 33 | 34 | 34 | 37 | 39 | 39 | 39 | 42 | 44 |
| Vicat Softening (10N load, 50 C. rate of rise) ASTM D 1525-softening temperature | 129° C. | 145 | 152 | 152 | 141 | 147 | 158 | 159 | 162 | 166 |
| Compression Set, Test Meth B, 25% Defl., 70 C., 22 hrs, ASTM D 395-percent set | 34% | 28 | 23 | 18 | 28 | 22 | 20 | 17 | 15 | 15 |
| Compression Set, Test Meth B, 25% Defl., RT, 22 hrs, ASTM D 395-percent set | 13% | 17 | 9 | 9 | 13 | 14 | 9 | 11 | 12 | 12 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claims:

1. A method for forming an article composed of a cross-linked thermoplastic polymer, the method comprising:

mixing a thermoplastic urethane based material and a monomeric diisocyanate to create a first mixture, the monomeric diisocyanate comprising between 1% to 10% of the total mass of the first mixture;

mixing 4,4'methylene-bis-(3-chloro-2,6-diethylaniline) and diethyl 2,4-toluenediamine to create a second mixture, wherein the 4,4'methylene-bis-(3-chloro-2,6-diethylaniline) is 75% to 95% of the total mass of the second mixture and diethyl 2,4-toluenediamine is 25% to 5% of the total mass of the second mixture;

heating the first mixture to a temperature within the range of 250° F. to 550° F. to create a heated first mixture;

heating the second mixture to a temperature greater than the melting point of the second mixture and less than 225° F. to create a liquid second mixture having a volume;

injecting the heated first mixture into a barrel of an injection molding machine through a first opening;

injecting the liquid second mixture into the barrel of the injection molding machine in a plurality of dispensing shots of approximately equal amounts of the volume of the liquid second mixture during a predetermined time period;

injecting a reaction product into at least one injection mold cavity, the reaction product formed by the reaction of the heated first mixture and the liquid second mixture;

forming an article composed of the reaction product.

* * * * *

UNITED STATES PATENT AND TRADEMARK OFFICE
CERTIFICATE OF CORRECTION

PATENT NO.        : 7,540,990 B1                                              Page 1 of 1
APPLICATION NO.   : 12/260279
DATED             : June 2, 2009
INVENTOR(S)       : Dewanjee It is certified that error appears in the above-identified patent and that said Letters Patent is hereby corrected as shown below:

Title Page; item (73);

ADD PRIPRO POLYMERS, INCORPORATED AS ADDITIONAL ASSIGNEE.

Signed and Sealed this

Twenty-first Day of September, 2010

David J. Kappos
*Director of the United States Patent and Trademark Office*